United States Patent
Obana et al.

(10) Patent No.: US 9,968,846 B2
(45) Date of Patent: *May 15, 2018

(54) INFORMATION PROCESSING APPARATUS, STORAGE MEDIUM HAVING STORED THEREIN INFORMATION PROCESSING PROGRAM, INFORMATION PROCESSING SYSTEM, AND INFORMATION PROCESSING METHOD

(71) Applicant: Nintendo Co., Ltd., Kyoto (JP)

(72) Inventors: Kazutoshi Obana, Kyoto (JP); Kochi Kawai, Kyoto (JP); Junichiro Miyatake, Nagaokakyo (JP); Masahiko Inami, Yokohama (JP); Kouta Minamizawa, Yokohama (JP)

(73) Assignee: Nintendo Co., Ltd., Kyoto (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/799,374

(22) Filed: Oct. 31, 2017

(65) Prior Publication Data

US 2018/0050271 A1 Feb. 22, 2018

Related U.S. Application Data

(63) Continuation of application No. 14/581,561, filed on Dec. 23, 2014, now Pat. No. 9,833,702.

(30) Foreign Application Priority Data

Jan. 30, 2014 (JP) ................................. 2014-015138

(51) Int. Cl.
*A63F 13/285* (2014.01)
*G06F 3/0481* (2013.01)
(Continued)

(52) U.S. Cl.
CPC ............ *A63F 13/285* (2014.09); *G06F 3/011* (2013.01); *G06F 3/016* (2013.01); *G06F 3/0481* (2013.01); *G06F 3/167* (2013.01); *A63F 13/28* (2014.09)

(58) Field of Classification Search
USPC .......................................................... 463/31
See application file for complete search history.

(56) References Cited

U.S. PATENT DOCUMENTS

| 6,864,877 B2 | 3/2005 | Braun et al. |
| 2006/0046843 A1 | 3/2006 | Nakajima |

(Continued)

FOREIGN PATENT DOCUMENTS

| JP | 2004-57654 A | 2/2004 |
| JP | 2006-68210 A | 3/2006 |

(Continued)

OTHER PUBLICATIONS

Steam, "A Different Kind of Gamepad", http://store.steampowered.com/livingroom/SteamController/, printed on Dec. 19, 2014, 10 pages.

*Primary Examiner* — Pierre E Elisca
(74) *Attorney, Agent, or Firm* — Nixon & Vanderhye P.C.

(57) ABSTRACT

A portable information processing apparatus includes a display, stereo loudspeakers, a pair of vibrators, and one or more processors. The pair of vibrators is provided on a left side and a right side of a main body of the information processing apparatus with respect to a center of the display. The one or more processors are configured to: generate sound signals to be output to the stereo loudspeakers, and output the sound signals; generate vibration signals for vibrating the pair of vibrators by vibrations, each having a plurality of frequency components, and output the vibration signals; and control an image to be displayed on the display.

20 Claims, 11 Drawing Sheets

(51) Int. Cl.
*G06F 3/01* (2006.01)
*G06F 3/16* (2006.01)
*A63F 13/28* (2014.01)

(56) References Cited

U.S. PATENT DOCUMENTS

| | | | | |
|---|---|---|---|---|
| 2011/0260996 A1* | 10/2011 | Henricson | ............... | G06F 3/016 |
| | | | | 345/173 |
| 2013/0318438 A1 | 11/2013 | Afshar | | |
| 2014/0248957 A1* | 9/2014 | Eck | ......................... | A63F 13/23 |
| | | | | 463/34 |
| 2014/0341386 A1* | 11/2014 | Cimaz | .................... | H04R 3/005 |
| | | | | 381/71.6 |

FOREIGN PATENT DOCUMENTS

| | | |
|---|---|---|
| WO | 2011/043292 A1 | 4/2011 |
| WO | 2013/049248 A2 | 4/2013 |

\* cited by examiner

F I G. 3
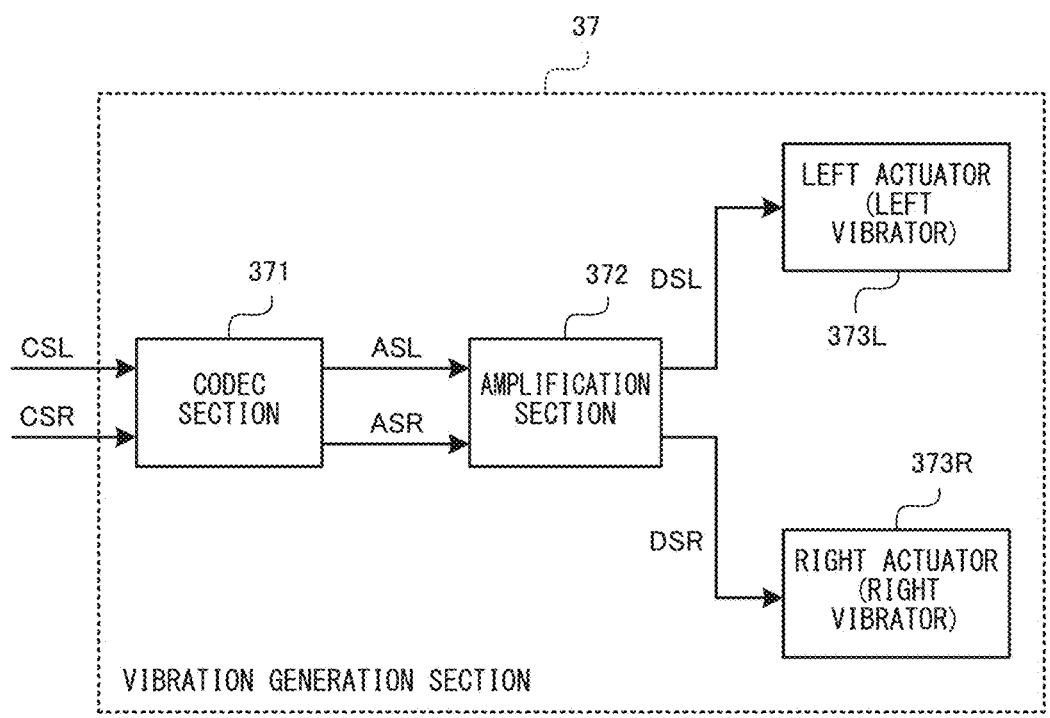

FIG. 4
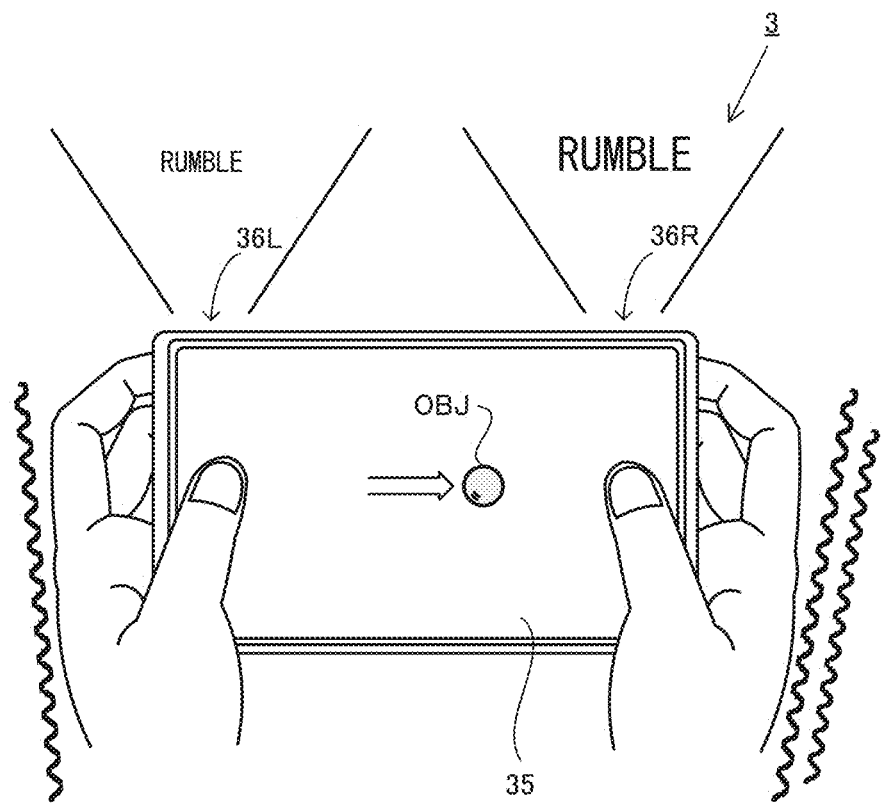
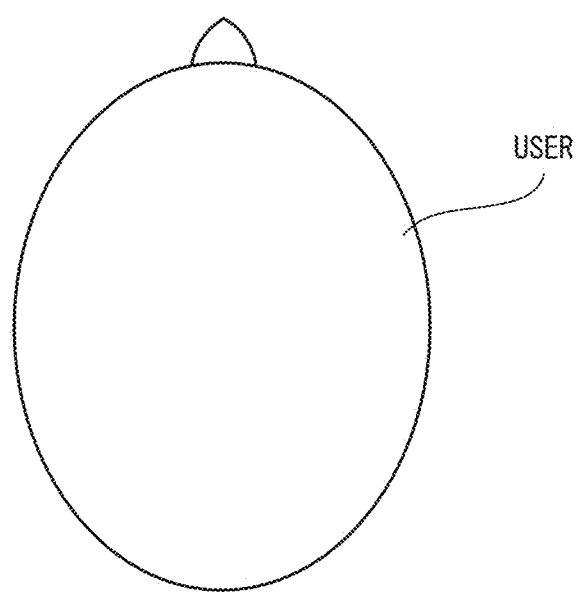

INFORMATION PROCESSING APPARATUS, STORAGE MEDIUM HAVING STORED THEREIN INFORMATION PROCESSING PROGRAM, INFORMATION PROCESSING SYSTEM, AND INFORMATION PROCESSING METHOD

CROSS REFERENCE TO RELATED APPLICATIONS

This application is a continuation of U.S. patent application Ser. No. 14/581,561, filed on Dec. 23, 2014; which claims priority to Japanese Patent Application No. 2014-15138, filed on Jan. 30, 2014. The disclosures of these applications are incorporated herein by reference.

FIELD

The technology shown here relates to an information processing apparatus, a storage medium having stored therein an information processing program, an information processing system, and an information processing method, and in particular, relates to an information processing apparatus, an information processing system, and an information processing method for, for example, controlling vibrations to be imparted to a user, and a storage medium having stored therein an information processing program for, for example, controlling vibrations to be imparted to a user.

BACKGROUND AND SUMMARY

Conventionally, a game apparatus for imparting vibrations to the main body of the apparatus is known. For example, the game apparatus imparts vibrations to the main body of the apparatus in accordance with the game situation and transmits the vibrations to the fingers and the hands of a user holding the apparatus.

In the game apparatus, however, the vibrations to be imparted to the fingers and the hands of the user are poor in variety.

Therefore, it is an object of an exemplary embodiment to provide an information processing apparatus, an information processing system, and an information processing method that are capable of imparting vibrations rich in variety to a user, and a storage medium having stored therein an information processing program capable of imparting vibrations rich in variety to a user.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of an information processing apparatus according to an exemplary embodiment is a portable information processing apparatus. The information processing apparatus includes a display, stereo loudspeakers, a pair of vibrators, and one or more processors. The pair of vibrators is provided on a left side and a right side of a main body of the information processing apparatus with respect to a center of the display. The one or more processors are configured to: generate sound signals to be output to the stereo loudspeakers, and output the sound signals; generate vibration signals for vibrating the pair of vibrators by vibrations, each having a plurality of frequency components, and output the vibration signals; and control an image to be displayed on the display.

Based on the above, a pair of vibrators provided on the left side and the right side imparts vibrations, each having a plurality of frequency components. This makes it possible to impart vibrations rich in variety to a user.

Further, in the generation and output of the vibration signals, the vibration signals for vibrating the vibrators by vibrations, each in a frequency range having a predetermined width, may be generated.

Based on the above, the pair of vibrators imparts vibrations, each in a frequency range having a predetermined width (e.g., vibrations in which values equal to or greater than a predetermined magnitude continue in at least one frequency range having a predetermined width). This makes it possible to impart vibrations rich in variety to the user.

Further, the vibration signals generated in the generation and output of the vibration signals may be subjected to predetermined processing and thereby may be able to be decoded into signals, each having a plurality of frequency components.

Based on the above, vibration signals are generated, whereby it is possible to directly control the frequency components of the vibrations to be imparted.

Further, in the generation and output of the vibration signals, a first vibration signal for vibrating one of the pair of vibrators and a second vibration signal for vibrating the other of the pair of vibrators may be generated and output.

Based on the above, vibration signals are output to the pair of vibrators. This makes it possible to independently control the vibrators.

Further, the stereo loudspeakers may be provided on the left side and the right side of the main body of the information processing apparatus with respect to the center of the display. In this case, the stereo loudspeakers and the vibrators may be placed at different positions in the main body of the information processing apparatus.

Based on the above, loudspeakers are also provided on the left side and the right side of the main body of the information processing apparatus similarly to the vibrators. This makes it easy to independently control vibrations and sounds while performing control by combining the vibrations and the sounds.

Further, the stereo loudspeakers and the vibrators may be placed at positions close to each other in the main body of the information processing apparatus.

Based on the above, the vibrators and the loudspeakers are placed close to each other. This makes it easy to independently control vibrations and sounds while performing control by combining the vibrations and the sounds.

Further, the information processing apparatus may further include a housing to be held by a user with both hands. In this case, one of the pair of vibrators may be placed in a portion of the housing that is held by the user with a right hand, and the other of the pair of vibrators may be placed in a portion of the housing that is held by the user with a left hand.

Based on the above, it is possible to efficiently transmit vibrations to the hands of the user holding a housing of the information processing apparatus.

Further, the information processing apparatus may further include a conversion unit. The conversion unit converts the vibration signals into analog signals, drives the vibrators using the analog signals, and vibrates the vibrators by vibrations, each having a plurality of frequency components.

Based on the above, vibration signals are converted into analog signals. This makes it possible to easily drive the vibrators.

Further, in the generation and output of the vibration signals, the vibration signals may be generated to obtain vibrations corresponding to the image controlled in the control of the image.

Based on the above, vibrations corresponding to a display image are imparted to the user. This makes it possible to provide a highly realistic experience to the user.

Further, in the control of the image, at least one object may be displayed on the display. In the generation and output of the vibration signals, a position of a vibration source to be perceived based on the vibrations of the pair of vibrators may be controlled in accordance with a position of the object displayed on the display.

Based on the above, an object display position is a vibration source, whereby it is possible to provide a more highly realistic experience to the user.

Further, in the generation and output of the sound signals, the sound signals may be generated to obtain sounds corresponding to the image controlled in the control of the image.

Based on the above, sounds corresponding to a display image are imparted. This makes it possible to provide a highly realistic experience to the user.

Further, in the control of the image, at least one object may be displayed on the display. In the generation and output of the sound signals, a position where sound sources are localized for sounds output from the stereo loudspeakers may be controlled in accordance with a position of the object displayed on the display.

Based on the above, an object display position is a sound source localization position, whereby it is possible to provide a more highly realistic experience to the user.

Further, in the generation and output of the vibration signals, the vibration signals may be generated to obtain vibrations corresponding to sounds controlled in the generation and output of the sound signals.

Based on the above, vibrations corresponding to sounds are imparted to the user. This makes it possible to provide a highly realistic experience to the user.

Further, in the generation and output of the sound signals, sounds to be output from the stereo loudspeakers may be controlled so that sound sources are localized at a predetermined position. In the generation and output of the vibration signals, a position of a vibration source to be perceived based on the vibrations of the vibrators may be controlled in accordance with the position of localization of the sound sources.

Based on the above, a sound source localization position is a vibration source. This makes it possible to provide a more highly realistic experience to the user.

Further, the information processing apparatus may further include a program storage medium. The program storage medium stores a sound generation program for generating the sound signals and a vibration generation program for generating the vibration signals. In this case, in the generation and output of the sound signals, the sound signals may be generated by executing the sound generation program. In the generation and output of the vibration signals, the vibration signals may be generated by executing the vibration generation program.

Based on the above, sounds and vibrations are controlled by executing programs. This enables flexible control.

Further, the information processing apparatus may further include a data storage medium. The data storage medium stores sound data regarding the sound signals and vibration data regarding the vibration signals. In this case, in the generation and output of the sound signals, the sound data stored in the data storage medium may be read to generate the sound signals. In the generation and output of the vibration signals, the vibration data stored in the data storage medium may be read to generate the vibration signals.

Based on the above, vibration data and sound data prepared in advance are used. This makes it possible to present vibrations and sounds rich in variety.

Further, in the control of the image, at least one object moving from a corresponding position in a virtual world displayed on the display to a corresponding position in the virtual world outside the display area and/or moving from the corresponding position in the virtual world outside the display area to the corresponding position in the virtual world displayed on the display may be displayed on the display. In the generation and output of the vibration signals, even if the object is placed at the corresponding position in the virtual world outside the display area, a position of a vibration source to be perceived based on the vibrations of the vibrators may be controlled in accordance with the placement position of the object.

Based on the above, even if an object is placed at a corresponding position in a virtual world outside a display area, the user is caused to perceive a vibration source and thereby can imagine the object placed in the corresponding position in the virtual world outside the display area.

Further, in the generation and output of the sound signals, even if the object is placed at the corresponding position in the virtual world outside the display area, a position where sound sources are localized for sounds output from the stereo loudspeakers may be controlled in accordance with the placement position of the object.

Based on the above, even if the object is placed at the corresponding position in the virtual world outside the display area, the position where sound sources are localized is outside the display screen. This makes it easier for the user to recognize the object placed at the corresponding position in the virtual world outside the display area.

Further, in the generation and output of the vibration signals, even if the object is placed at the corresponding position in the virtual world outside the display area, the pair of vibrators may be simultaneously vibrated based on distribution of intensities of vibrations corresponding to the placement position of the object, thereby causing a user to perceive the placement position as the vibration source based on the vibrations of the vibrators.

Based on the above, the distribution of intensities of vibrations to be imparted to the pair of vibrators is adjusted. Thus, even in a space formed outside between the pair of vibrators, it is possible to easily set the vibration source.

Further, in the generation and output of the vibration signals, if the object is placed at the corresponding position in the virtual world displayed on the display, the position of the vibration source may be controlled in accordance with the placement position of the object.

Based on the above, even if the object is placed at a corresponding position in the virtual world displayed on a display, it is possible to cause the user to perceive the object placed at the corresponding position as the vibration source.

Further, in the generation and output of the vibration signals, at least either if the object moves from the corresponding position in the virtual world displayed on the display to the corresponding position in the virtual world outside the display area, or if the object moves from the corresponding position in the virtual world outside the display area to the corresponding position in the virtual world displayed on the display, the position of the vibration source may be controlled without interruption.

Based on the above, if the object moves from the virtual world within the display area to the virtual world outside the display area, and if the object moves from the virtual world outside the display area to the virtual world within the display area, it is possible to cause the user to perceive the object as the vibration source without interruption.

Further, in the generation and output of the vibration signals, the vibration signals may be generated such that as the object moves toward a position, in the virtual world, corresponding to a left reference position provided on the left side of the main body of the information processing apparatus, vibrations of the vibrators corresponding to the left side increase, and as the object moves away from the position, in the virtual world, corresponding to the left reference position, the vibrations of the vibrators corresponding to the left side decrease. In the generation and output of the vibration signals, the vibration signals may be generated such that as the object moves toward a position, in the virtual world, corresponding to a right reference position provided on the right side of the main body of the information processing apparatus, vibrations of the vibrators corresponding to the right side increase, and as the object moves away from the position, in the virtual world, corresponding to the right reference position, the vibrations of the vibrators corresponding to the right side decrease.

Based on the above, if the object is moving at a position in the virtual world corresponding to a reference position provided to the left and right of the main body of the information processing apparatus, vibrations to be imparted by the vibrators and corresponding to the reference position are maximized. This makes it possible to cause the user to perceive the moving object as the vibration source with more certainty.

Further, in the generation and output of the vibration signals, if the object has moved to pass through a position, in the virtual world, corresponding to a left reference position provided on the left side of the main body of the information processing apparatus, the vibration signals may be generated such that magnitudes of vibrations of the vibrators corresponding to the left reference position increase in accordance with the movement of the object until the object reaches the position, in the virtual world, corresponding to the left reference position, and after the object has passed through the position, in the virtual world, corresponding to the left reference position, the vibration signals may be generated such that the magnitudes of the vibrations decrease in accordance with the movement of the object. In the generation and output of the vibration signals, if the object has moved to pass through a position, in the virtual world, corresponding to a right reference position provided on the right side of the main body of the information processing apparatus, the vibration signals may be generated such that magnitudes of vibrations of the vibrators corresponding to the right reference position increase in accordance with the movement of the object until the object reaches the position, in the virtual world, corresponding to the right reference position, and after the object has passed through the position, in the virtual world, corresponding to the right reference position, the vibration signals may be generated such that the magnitudes of the vibrations decrease in accordance with the movement of the object.

Based on the above, if the object passes through a position in the virtual world corresponding to a reference position provided to the left and right of the main body of the information processing apparatus, vibrations to be imparted by the vibrators and corresponding to the reference position are maximized. This makes it possible to cause the user to perceive the moving object as the vibration source with more certainty.

Further, the exemplary embodiment may be carried out in the form of a non-transitory computer-readable storage medium having stored therein having an information processing program, an information processing system, or an information processing method.

According to the exemplary embodiment, a pair of vibrators provided on the left side and the right side imparts vibrations, each having a plurality of frequency components. This makes it possible to impart vibrations rich in variety to a user.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3 is a block diagram showing a non-limiting example of the configuration of a vibration generation section 37;

FIG. 4 is a diagram showing a non-limiting example where the main body of the information processing apparatus 3 vibrates and simultaneously, sounds are output, in accordance with the display position of a virtual object OBJ displayed on a display screen of a display section 35;

DETAILED DESCRIPTION OF NON-LIMITING EXAMPLE EMBODIMENTS

With reference to the drawings, an information processing apparatus for executing an information processing program according to an exemplary embodiment is described. While the information processing program according to the exemplary embodiment can be applied by being executed by any computer system, a handheld information processing apparatus 3 (a tablet terminal) is used as an example of the information processing apparatus, and the information processing program according to the exemplary embodiment is described using an information processing program executed by the information processing apparatus 3. For example, the information processing apparatus 3 can execute a program and a pre-installed program (e.g., a game program) stored in a storage medium such as an exchangeable optical disk or an exchangeable memory card, or received from another apparatus. As an example, the information processing apparatus 3 can display on a screen an image generated by a computer graphics process, such as a virtual space image viewed from a virtual camera set in a virtual space. The information processing apparatus 3 may be a device such as a general personal computer, a stationary game apparatus, a mobile phone, a handheld game apparatus, or a PDA (Personal Digital Assistant). It should be noted that FIG. 1 is a plan view of an example of the external appearance of the information processing apparatus 3.

Figure 1:
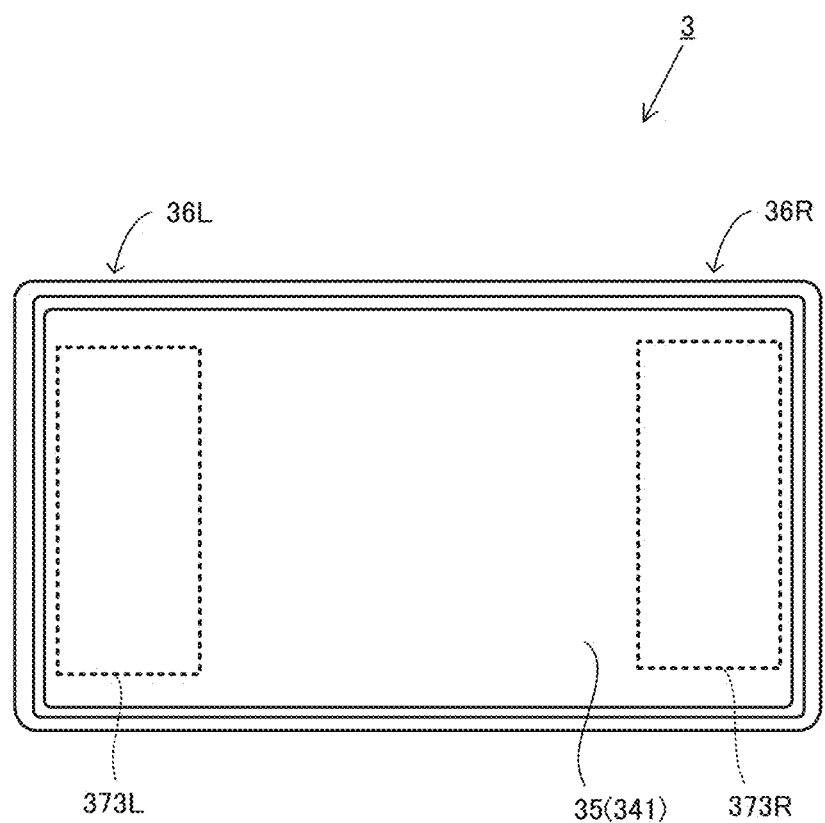
FIG. 1 is a plan view of a non-limiting example of the external appearance of an information processing apparatus 3.

In FIG. 1, the information processing apparatus 3 includes a display section 35, a sound output section 36, and an actuator 373. As an example, the display section 35 is provided on the front surface of the main body of the information processing apparatus 3. For example, the display section 35 includes an LCD (Liquid Crystal Display) and may employ, for example, a display device using EL. Further, the display section 35 may be a display device capable of displaying a stereoscopically viewable image.

A touch panel 341, which is an example of an input section 34, is provided so as to cover a display screen of the display section 35. The touch panel 341 detects the position of an input provided to a predetermined input surface (e.g., the display screen of the display section 35). It should be noted that the input section 34 is an input device that allows a user of the information processing apparatus 3 to input an operation, and the input section 34 may be any input device. For example, as the input section 34, an operation section such as a slide pad, an analog stick, a directional pad, an operation button, or the like may be provided on the side surfaces, the back surface, or the like of the main body of the information processing apparatus 3. Further, the input section 34 may be a sensor for detecting the orientation and the motion of the main body of the information processing apparatus 3. For example, the input section 34 may be an acceleration sensor for detecting the acceleration generated in the main body of the information processing apparatus 3, an angular velocity sensor (a gyro sensor) for detecting the amount of rotation of the main body of the information processing apparatus 3, or the like.

The sound output section 36 includes loudspeakers for outputting sounds, and in the example shown in FIG. 1, includes a pair of stereo loudspeakers (a left sound output section 36L and a right sound output section 36R) provided on the left and right of the upper side surface or the back surface of the information processing apparatus 3. The sound output section 36 performs D/A conversion on sound signals (a left sound control signal and a right sound control signal) output from a control section 31 described later, thereby generating analog sound signals (a left analog sound signal and a right analog sound signal). Then, the sound output section 36 outputs the analog sound signals to the loudspeakers (e.g., the stereo loudspeakers), thereby outputting sounds.

The actuator 373 is a vibration actuator (a vibrator) for imparting predetermined vibrations to the main body of the information processing apparatus 3 and is included in a vibration generation section 37 described later. In the example shown in FIG. 1, the actuator 373 includes a left actuator 373L, which is provided on the left and inside the main body of the information processing apparatus 3, and a right actuator 373R, which is provided on the right and inside the main body of the information processing apparatus 3. Specifically, as indicated by dashed line areas in FIG. 1, the left actuator 373L is provided on the left side of the display section 35, which is a position near the left hand of the user when holding a left end portion of the information processing apparatus 3 with the left hand. Further, the right actuator 373R is provided on the right side of the display section 35, which is a position near the right hand of the user when holding a right end portion of the information processing apparatus 3 with the right hand. Further, the vibration generation section 37 performs D/A conversion on vibration control signals (a left vibration control signal and a right vibration control signal) output from the control section 31 described later, thereby generating analog vibration signals (a left analog vibration signal and a right analog vibration signal). Then, the vibration generation section 37 outputs driving signals obtained by amplifying the analog vibration signals to the actuator 373 (the left actuator 373L and the right actuator 373R), thereby driving the actuator 373.

It should be noted that as is clear from FIG. 1, the display screen of the display section 35, the left sound output section 36L, and the right sound output section 36R, which are provided in the information processing apparatus 3, are placed at positions close to one another. The display screen of the display section 35, the left actuator 373L, and the right actuator 373R are placed at positions close to one another. Further, the left sound output section 36L and the left actuator 373L are placed at positions close to each other, but are different units disposed at different positions. The right sound output section 36R and the right actuator 373R are placed at positions close to each other, but are different units disposed at different positions. Consequently, it is possible to include a unit dedicated to outputting vibrations and a unit dedicated to outputting sounds. Thus, it is possible to output vibrations and sounds more accurately than when a general-purpose unit is shared. It should be noted that modules into which a unit for outputting vibrations and a unit for outputting sounds are combined and integrated may be provided on the left and right of the information processing apparatus 3.

Figure 2:
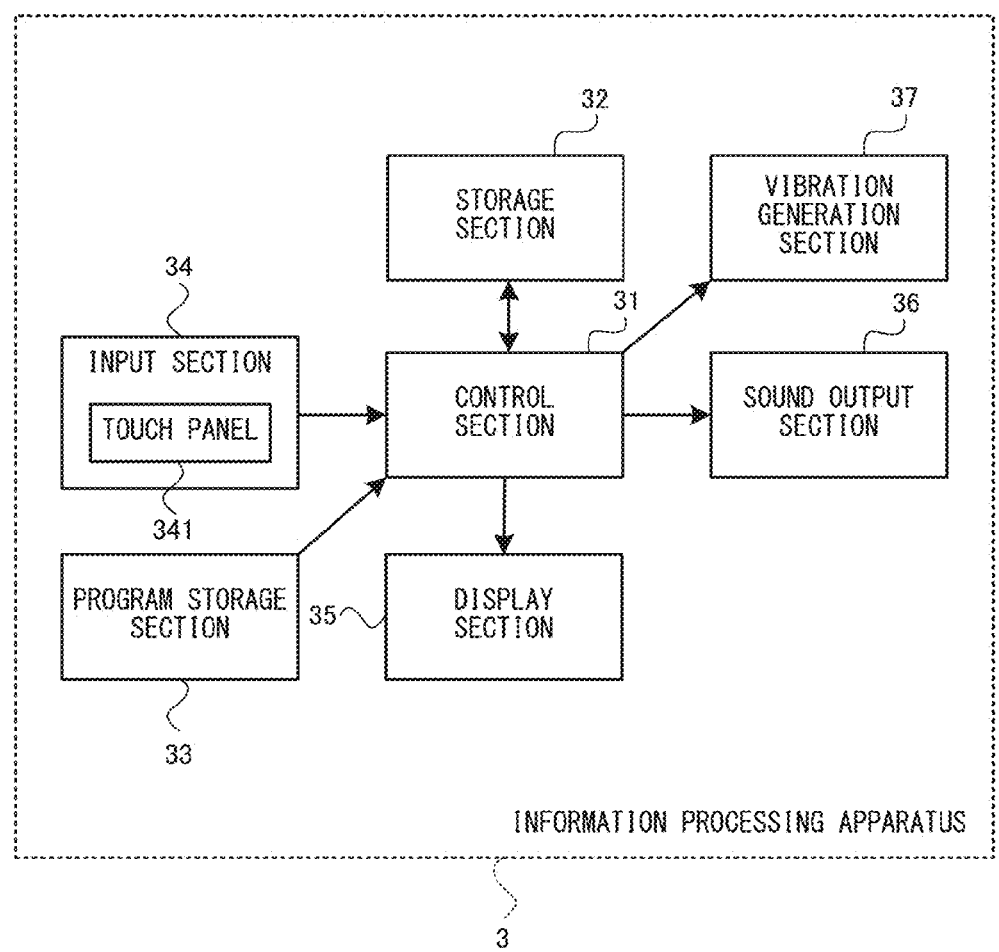
FIG. 2 is a block diagram showing a non-limiting example of the configuration of the information processing apparatus 3.

Next, with reference to FIG. 2, the internal configuration of the information processing apparatus 3 is described. It should be noted that FIG. 2 is a block diagram showing an example of the configuration of the information processing apparatus 3.

In FIG. 2, the information processing apparatus 3 includes the control section 31, a storage section 32, and a program storage section 33 in addition to the input section 34, the display section 35, the sound output section 36, and the vibration generation section 37, which are described above.

It should be noted that the information processing apparatus 3 may be composed of one or more apparatuses including an information processing apparatus having at least the control section 31, and another apparatus.

The control section 31 is information processing means (a computer) for performing various types of information processing and is, for example, a CPU. The control section 31 has the function of performing, as the various types of information processing, processing or the like corresponding to an operation performed on the input section 34 by the user. For example, the functions of the control section 31 are achieved by, for example, the CPU executing a predetermined program.

As the various types of information processing, the control section 31 controls the display of an image to be displayed on the display section 35. Further, as the various types of information processing, the control section 31 outputs, to the sound output section 36, sound control signals (e.g., digital sound signals) for controlling sounds to be output from the stereo loudspeakers. Further, as the various types of information processing, the control section 31 outputs, to the vibration generation section 37, vibration control signals (e.g., digital vibration signals) for controlling vibrations of the actuator 373 (the left actuator 373L and the right actuator 373R).

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus 3 having the control section 31, or may be a storage medium detachably attached to the information processing apparatus 3 having the control section 31. Alternatively, the program storage section 33 may be a storage device (a server or the like) connected to the control section 31 via a network. The control section 31 (the CPU) may read a part or all of the program to the storage section 32 at appropriate timing and execute the read program.

Next, with reference to FIG. 3, the configuration of the vibration generation section 37 is described. It should be noted that FIG. 3 is a block diagram showing an example of the configuration of the vibration generation section 37.

In FIG. 3, the vibration generation section 37 includes a codec section 371, an amplification section 372, the left actuator (left vibrator) 373L, and the right actuator (right vibrator) 373R.

The codec section 371 acquires vibration control signals output from the control section 31 and performs a predetermined decoding process on the vibration control signals, thereby generating analog vibration signals. Then, the codec section 371 outputs the analog vibration signals to the amplification section 372. For example, if a plurality of actuators 373 are provided and independent vibrations are generated by the respective actuators 373 (e.g., the left actuator 373L and the right actuator 373R), the control section 31 outputs vibration control signals (e.g., a left vibration control signal CSL and a right vibration control signal CSR) for controlling vibrations in the respective actuators 373. In this case, the codec section 371 decodes the vibration control signals output from the control section 31, thereby generating analog vibration signals (e.g., a left analog vibration signal ASL and a right analog vibration signal ASR) for generating vibrations in the respective actuators 373. Then, the codec section 371 outputs the analog vibration signals to the amplification section 372.

The amplification section 372 amplifies the analog vibration signals output from the codec section 371, thereby generating driving signals for driving the actuator 373. Then, the amplification section 372 outputs the driving signals to the actuator 373. For example, if a plurality of actuators 373 are provided (e.g., if the left actuator 373L and the right actuator 373R are provided), the amplification section 372 increases changes in the amplitudes of the current and/or the voltage of each of the analog vibration signals (e.g., the left analog vibration signal ASL and the right analog vibration signal ASR) output from the codec section 371, thereby generating driving signals (e.g., a left driving signal DSL and a right driving signal DSR). Then, the amplification section 372 outputs the driving signals to the respective actuators 373 (e.g., the left actuator 373L and the right actuator 373R).

The actuator 373 is driven in accordance with the driving signals output from the amplification section 372, thereby imparting vibrations corresponding to the driving signals to the main body of the information processing apparatus 3. For example, as shown in FIG. 1, the actuator 373 includes the left actuator 373L and the right actuator 373R, which are provided on the left side and the right side of the main body of the information processing apparatus 3 with respect to the center of the display screen of the display section 35. As an example, the left actuator 373L is placed in a part of the main body of the information processing apparatus 3 that is held by the user with the left hand, and the right actuator 373R is placed in a part of the main body of the information processing apparatus 3 that is held by the user with the right hand. Here, the method of the actuator 373 to impart vibrations to the main body of the information processing apparatus 3 may be any method. For example, the actuator 373 may use the method of generating vibrations by an eccentric motor (ERM: Eccentric Rotating Mass), the method of generating vibrations by a linear vibrator (LRA: Linear Resonant Actuator), the method of generating vibrations by a piezoelectric element, or the like. If the driving signals to be output from the amplification section 372 are generated in accordance with the method of the actuator 373 to generate vibrations, an actuator using any method can impart various vibrations to the user of the information processing apparatus 3.

It should be noted that in the configuration of the vibration generation section 37, one or more codec sections and one or more amplification sections may be provided. For example, a codec section and an amplification section can be provided in each of a plurality of actuators 373 that are provided. In the above description, an example has been used where driving signals for driving the actuator 373 are generated by amplifying the analog vibration signals generated by the codec section 371. Alternatively, the signals output from the codec section 371 to the amplification section 372 may be digital signals. For example, if the actuator 373 is driven by pulse width modulation (PWM) control, the codec section 371 may generate pulse signals for turning on and off the actuator 373. In this case, the signals output from the codec section 371 to the amplification section 372 are digital vibration signals for controlling the driving of the actuator 373 using pulse waves. Consequently, the amplification section 372 amplifies the digital vibration signals.

Figure 5:
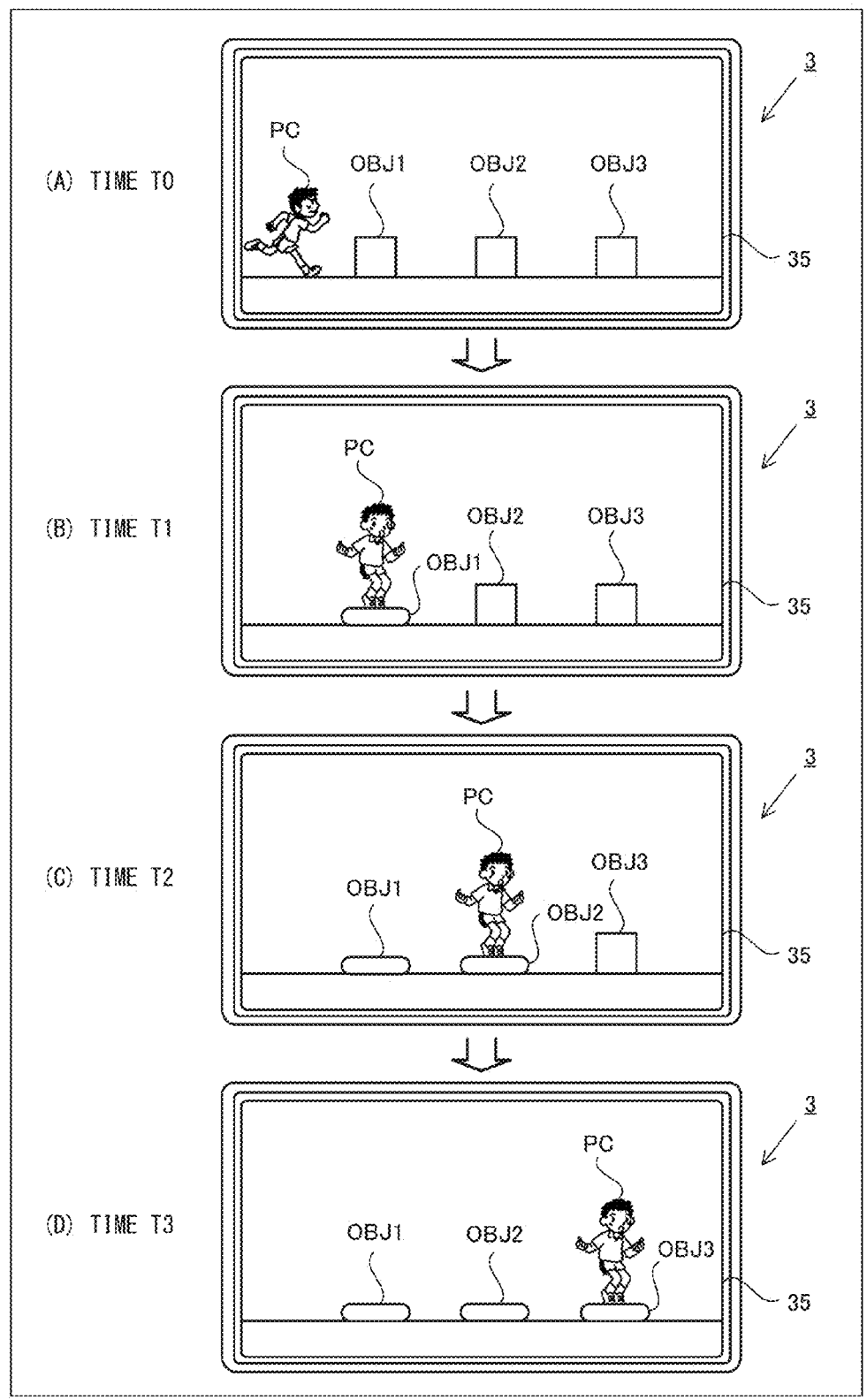
FIG. 5 is diagrams showing non-limiting examples of images of a first exemplary game displayed on the display screen of the display section 35.
Figure 6:
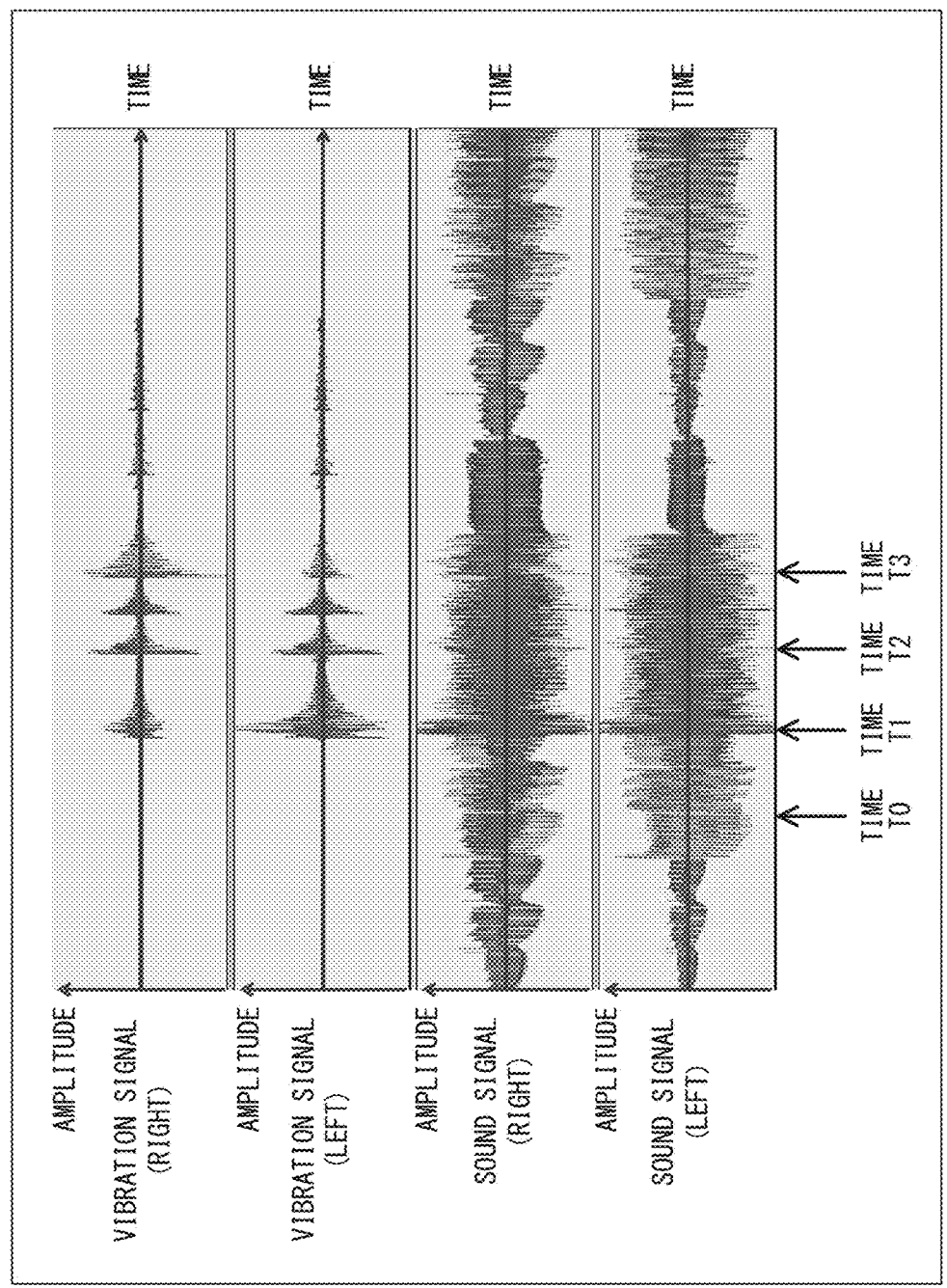
FIG. 6 is a diagram illustrating non-limiting examples of vibrations imparted to the main body of the information processing apparatus 3 and non-limiting examples of sounds output from the information processing apparatus 3 in the first exemplary game.
Figure 7:
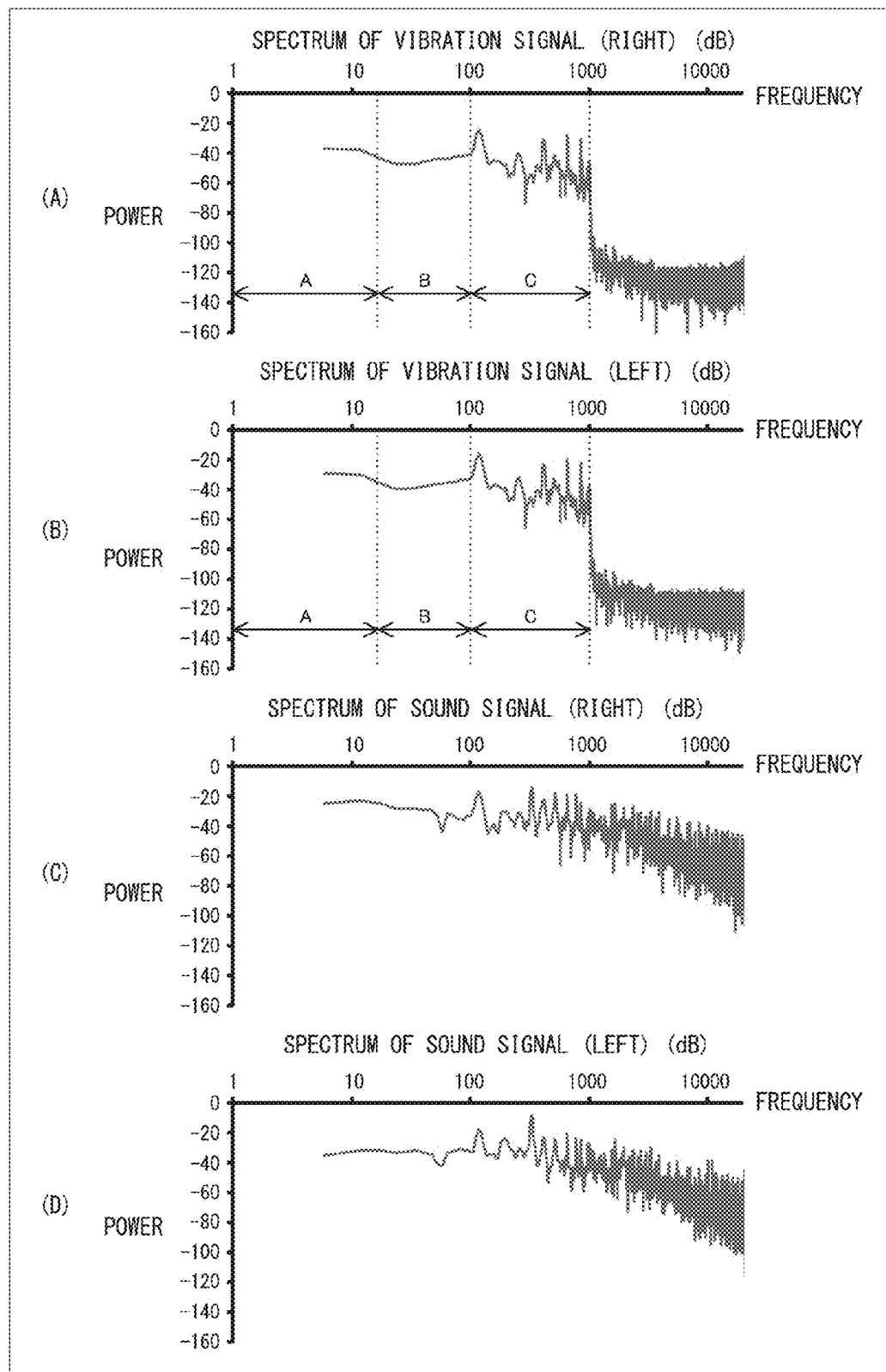
FIG. 7 is diagrams illustrating non-limiting examples of the spectra of vibrations imparted to the main body of the information processing apparatus 3 and non-limiting examples of the spectra of sounds output from the information processing apparatus 3, near a time T1 in the first exemplary game.
Figure 8:
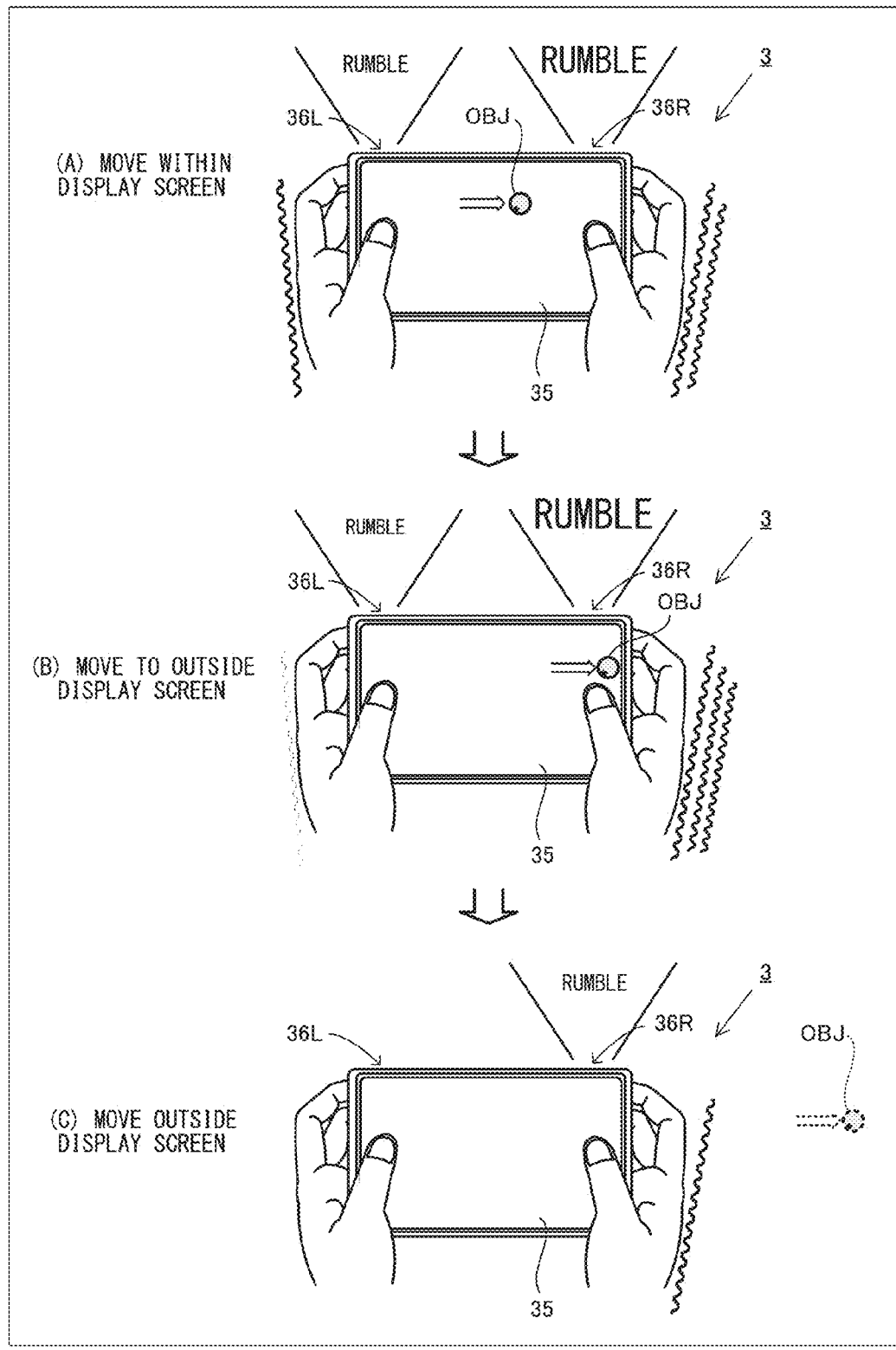
FIG. 8 is diagrams showing a non-limiting example where, when the virtual object OBJ moves from within the display screen of the display section 35 to outside the display screen in a second exemplary game, the main body of the information processing apparatus 3 vibrates and simultaneously, sounds are output.
Figure 9:
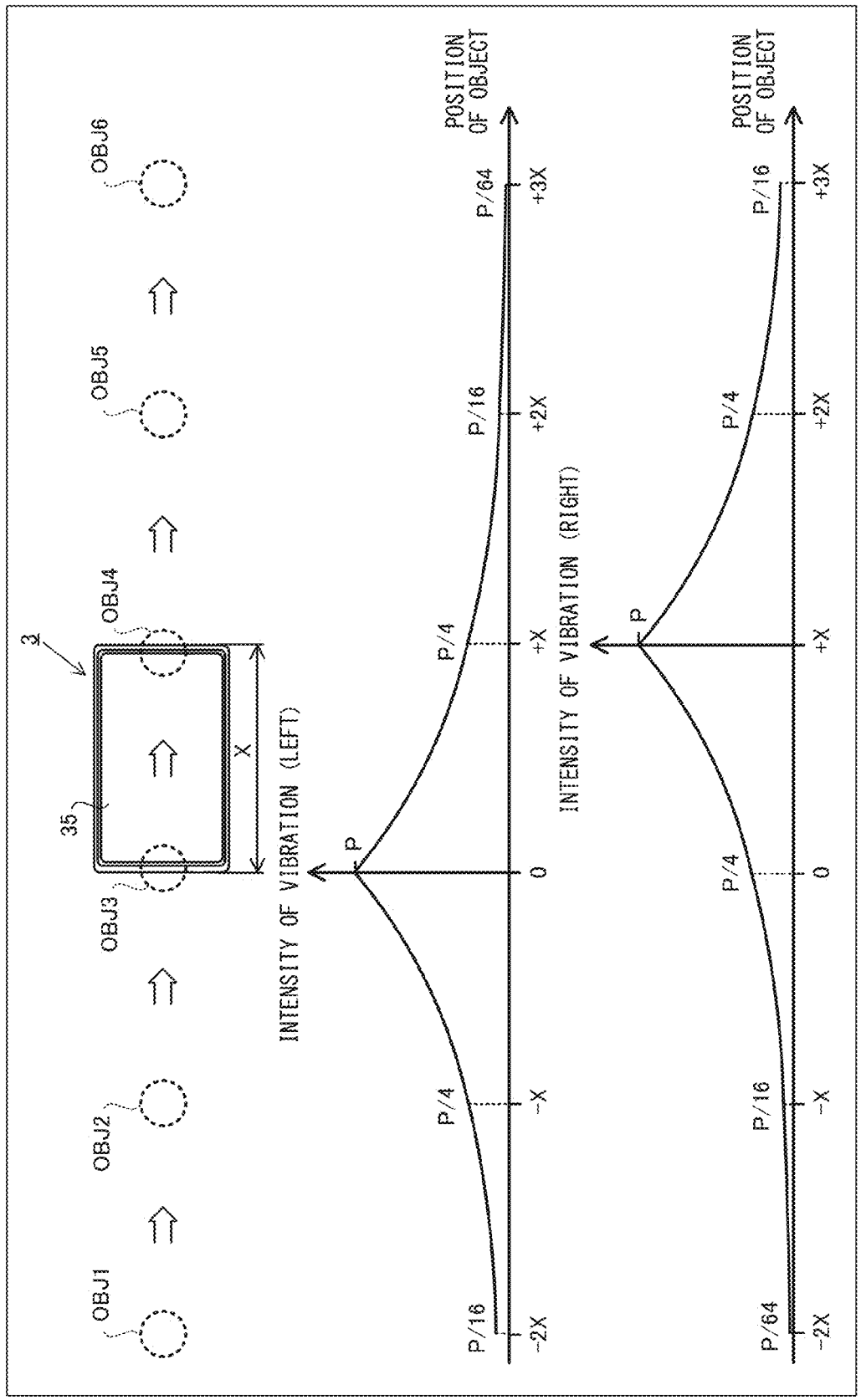
FIG. 9 is a diagram showing non-limiting examples of the intensities of vibrations imparted to the main body of the information processing apparatus 3 when the virtual object OBJ moves from within the display screen of the display section 35 to outside the display screen in the second exemplary game.

Next, with reference to FIGS. 4 to 9, a description is given of an overview of the processing performed by the information processing apparatus 3, before the description of specific processing performed by the information processing apparatus 3. In the following descriptions, the process of performing a game where a player character PC and a virtual object OBJ move within or outside the display screen of the display section 35 is used as an example of the information processing performed by the information processing apparatus 3. It should be noted that FIG. 4 is a diagram showing an example where the main body of the information processing apparatus 3 vibrates and simultaneously, sounds are output, in accordance with the display position of the virtual object OBJ displayed on the display screen of the display section 35. FIG. 5 is diagrams showing images of a first exemplary game displayed on the display screen of the display section 35. FIG. 6 is a diagram illustrating examples of vibrations imparted to the main body of the information processing apparatus 3 and examples of sounds output from the information processing apparatus 3 in the first exemplary game. FIG. 7 is diagrams illustrating examples of the spectra of vibrations imparted to the main body of the information processing apparatus 3 and examples of the spectra of sounds output from the information processing apparatus 3, near a time T1 in the first exemplary game. FIG. 8 is diagrams showing an example where, when the virtual object OBJ moves from within the display screen of the display section 35 to outside the display screen in a second exemplary game, the main body of the information processing apparatus 3 vibrates and simultaneously, sounds are output. FIG. 9 is a diagram showing examples of the intensities of vibrations imparted to the main body of the information processing apparatus 3 when the virtual object OBJ moves from within the display screen of the display section 35 to outside the display screen in the second exemplary game.

In the example shown in FIG. 4, a virtual object OBJ moving in a virtual world is displayed on the display screen of the display section 35. The virtual object OBJ is displayed on the display screen of the display section 35 so as to move in the virtual world in accordance with an operation of the user or automatically.

In accordance with the movement of the virtual object OBJ, the main body of the information processing apparatus 3 vibrates and simultaneously, sounds are output. For example, in accordance with the display position of the virtual object OBJ displayed on the display screen of the display section 35, the left actuator 373L and the right actuator 373R, which are provided in the main body of the information processing apparatus 3, generate vibrations to occur when the virtual object OBJ moves. As an example, with the use of phantom sensation that stimulates two different points in the user's skin (specifically, the left hand and the right hand of the user holding the main body of the information processing apparatus 3) to cause the user to perceive a pseudo stimulus at one point, the left actuator 373L and the right actuator 373R impart, to the user of the information processing apparatus 3, vibrations for causing the user to perceive the display position of the virtual object OBJ as the vibration source in a pseudo manner (vibrations for causing the display position of the virtual object OBJ to be the position where a pseudo force sense is presented). Further, the pair of stereo loudspeakers (the left sound output section 36L and the right sound output section 36R) provided in the main body of the information processing apparatus 3 output sounds such that the position where the sound sources are localized is the display position of the virtual object OBJ displayed on the display screen of the display section 35. As described above, the display position of the virtual object OBJ, the position to be perceived as the vibration source in a pseudo manner (a pseudo force sense presentation position), and the sound source localization position are substantially matched. This can provide a realistic experience using visual sensation, tactile sensation, and auditory sense to the user. Further, vibrations imparted by the left actuator 373L and the right actuator 373R and sounds output from the left sound output section 36L and the right sound output section 36R are generated by imitating the vibrations and sounds when the virtual object OBJ moves. This can further enhance the reality.

Next, with reference to FIG. 5, a description is given of a first exemplary game, which can be played using the information processing apparatus 3. In the first exemplary game, in accordance with an operation of the user of the information processing apparatus 3, at least a part of a virtual world including a player character PC, which can move in the virtual world, is displayed on the display screen of the display section 35. For example, the player character PC moves in the virtual world in accordance with an operation of the user using the input section 34 (e.g., the state of a time T0 shown in (A) of FIG. 5).

In the virtual world displayed on the display screen of the display section 35, a plurality of virtual objects OBJ1 to OBJ3 are placed. If the virtual objects OBJ1 to OBJ3 have come into contact with the player character PC in the virtual world (e.g., have been stepped on by the player character PC), then in the progression of the game, the sounds of contact (e.g., crushing sounds) are output from the information processing apparatus 3, and simultaneously, the vibrations when the virtual objects OBJ1 to OBJ3 have come into contact with the player character PC are imparted to the information processing apparatus 3. For example, at a time T1, which is chronologically later than the time T0, the state where the player character PC has come into contact with the virtual object OBJ1 in the virtual world is displayed on the display screen of the display section 35 (see (B) of FIG. 5). At this time, in the first exemplary game, sounds indicating that the virtual object OBJ1 and the player character PC have come into contact with each other are output from the stereo loudspeakers (the left sound output section 36L and the right sound output section 36R) such that the position where the contact is displayed is the sound source localization position. Further, in the first exemplary game, vibrations indicating that the virtual object OBJ1 and the player character PC have come into contact with each other are imparted by the left actuator 373L and the right actuator 373R such that the position where the contact is displayed is the position to be perceived as the vibration source in a pseudo manner.

Further, at a time T2, which is chronologically later than the time T1, the state where the player character PC has come into contact with the virtual object OBJ2 in the virtual world is displayed on the display screen of the display section 35 (see (C) of FIG. 5). At this time, in the first exemplary game, sounds indicating that the virtual object OBJ2 and the player character PC have come into contact with each other are output from the stereo loudspeakers such that the position where the contact is displayed is the sound source localization position. Simultaneously, vibrations indicating that the virtual object OBJ2 and the player character PC have come into contact with each other are imparted by the left actuator 373L and the right actuator 373R such that the position where the contact is displayed is the position to be perceived as the vibration source in a pseudo manner.

Further, at a time T3, which is chronologically later than the time T2, the state where the player character PC has come into contact with the virtual object OBJ3 in the virtual world is displayed on the display screen of the display section 35 (see (D) of FIG. 5). At this time, in the first exemplary game, sounds indicating that the virtual object OBJ3 and the player character PC have come into contact with each other are output from the stereo loudspeakers such that the position where the contact is displayed is the sound source localization position. Simultaneously, vibrations indicating that the virtual object OBJ3 and the player character PC have come into contact with each other are imparted by the left actuator 373L and the right actuator 373R such that the position where the contact is displayed is the position to be perceived as the vibration source in a pseudo manner.

As shown in FIG. 6, in the first exemplary game, vibrations different from each other are imparted by the left actuator 373L and the right actuator 373R to the main body of the information processing apparatus 3, thereby achieving the above phantom sensation. For example, at the time T1, the amplitude of the vibration imparted by the left actuator 373L to the main body of the information processing apparatus 3 (the vibration signal (the left side); for example, indicating the driving signal for driving the left actuator 373L or the left analog vibration signal) is greater than the amplitude of the vibration imparted by the right actuator 373R to the main body of the information processing apparatus 3 (the vibration signal (the right side); for example, indicating the driving signal for driving the right actuator 373R or the right analog vibration signal). This is because, as shown in (B) of FIG. 5, at the time T1, on the display screen of the display section 35, the player character PC has come into contact with the virtual object OBJ1 in an area to the left of the center of the display screen. Thus, the vibration to be imparted from the left side is made stronger than the vibration to be imparted from the right side, whereby it is possible to cause the user to perceive as the vibration source the position on the left of the display screen where the contact is displayed.

On the other hand, at the time T3, the amplitude of the vibration imparted by the right actuator 373R to the main body of the information processing apparatus 3 is greater than the amplitude of the vibration imparted by the left actuator 373L to the main body of the information processing apparatus 3. This is because, as shown in (D) of FIG. 5, at the time T3, on the display screen of the display section 35, the player character PC has come into contact with the virtual object OBJ3 in an area to the right of the center of the display screen. Thus, the vibration to be imparted from the right side is made stronger than the vibration to be imparted from the left side, whereby it is possible to cause the user to perceive as the vibration source the position on the right of display screen where the contact is displayed.

Further, as shown in FIG. 7, in the first exemplary game, each of the left actuator 373L and the right actuator 373R imparts a vibration having a plurality of frequency components (a vibration having not only a single frequency component) to the main body of the information processing apparatus 3. For example, (A) of FIG. 7 and (B) of FIG. 7 show examples of the spectra of the vibrations imparted to the main body of the information processing apparatus 3 near the time T1 and indicate that a vibration in a frequency range having a predetermined width (a vibration in a wide band) is imparted by each of the left actuator 373L and the right actuator 373R to the main body of the information processing apparatus 3. More specifically, a vibration having power in the entire area of the frequency range from a frequency component lower than 10 Hz (hertz) to a frequency component higher than 1 kHz (kilohertz) is imparted by each of the left actuator 373L and the right actuator 373R to the main body of the information processing apparatus 3. Here, the sensory receptors of a human being for receiving cutaneous sensation include Merkel discs, Meissner corpuscles, Pacinian corpuscles, Ruffini endings, and the like. The Merkel discs are regarded as responding to vibrations at 0 to 200 Hz. The Meissner corpuscles are regarded as responding to vibrations at 20 to 100 Hz and regarded as having the highest sensitivity to vibrations near 30 Hz. Pacinian corpuscles are regarded as responding to vibrations at 100 to 300 Hz and regarded as having the highest sensitivity to vibrations near 200 Hz. The vibrations imparted by the left actuator 373L and the right actuator 373R to the main body of the information processing apparatus 3 include vibrations in the frequency range of 0 to 1 kHz, which is regarded as being able to be felt by a human being or include part of vibrations in this frequency range, and also include frequency components to which these sensory receptors can respond (frequency components in areas A to C shown in (A) of FIG. 7 and (B) of FIG. 7). This makes it possible to reproduce a touch rich in reality and present the touch to the user.

Further, as shown in FIG. 7, vibrations that can be imparted to the user of the information processing apparatus 3 and sounds that are output from the information processing apparatus 3 can have different spectra. For example, the information processing apparatus 3 can impart, to the user, vibrations around a wide band of 0 to 1000 Hz, which is regarded as being able to be felt by a human being, and can also output sounds around a wide band of 20 to 20000 Hz, which include audio frequencies audible to the human ear. Thus, the vibrations and the sounds can have different spectra by controlling different vibrators (the left actuator 373L, the right actuator 373R, and the stereo loudspeakers) by different control signals.

In the exemplary embodiment, vibration data for imparting vibrations to the main body of the information processing apparatus 3 and sound data for outputting sounds from the information processing apparatus 3 may be prepared separately in advance. In this case, vibration data corresponding to the type of vibrations to be imparted to the main body of the information processing apparatus 3 is extracted and read from the prepared vibration data, thereby generating vibration control signals. Further, sound data corresponding to sounds to be output from the information processing apparatus 3 is extracted and read from the prepared sound data, thereby generating sound control signals. It should be noted that in the vibration data, vibration data for imparting a vibration from the left actuator 373L and vibration data for imparting a vibration from the right actuator 373R may be prepared separately. As an example, a pair of left and right pieces of vibration data may be prepared in advance based on the position of the vibration source. Then, when vibrations are imparted to the main body of the information processing apparatus 3, a pair of left and right pieces of vibration data corresponding to the position to be perceived as the vibration source may be read. Further, it goes without saying that also in the sound data, sound data for outputting a sound from the left loudspeaker and sound data for outputting a sound from the right loudspeaker may be prepared separately. Further, sound data prepared in advance may be used as vibration data. Sound data is also data used to vibrate and drive a diaphragm of a loudspeaker and therefore can be used as data for vibrating and driving a vibrator (i.e., vibration data).

Further, in the exemplary embodiment, a vibration control signal (the left vibration control signal CSL) for driving the left actuator 373L and a vibration control signal (the right vibration control signal CSR) for driving the right actuator 373R may be generated independently of each other, or may be generated by processing a single vibration control signal. For example, in the second case, a single vibration control signal prepared in advance in accordance with the intensity of the vibration for vibrating each actuator can be processed, thereby generating the left vibration control signal CSL and the right vibration control signal CSR.

Next, with reference to FIG. 8, a description is given of a second exemplary game, which can be played using the information processing apparatus 3. In the second exemplary game, a virtual object OBJ that can move is placed in a virtual world, and the virtual object OBJ moves not only in the virtual world displayed on the display screen of the display section 35, but also in the virtual world outside the display screen.

For example, as shown in (A) of FIG. 8, if the state where the virtual object OBJ is moving in the virtual world displayed within the display screen of the display section 35 is displayed, then based on the display position of the virtual object OBJ, the sounds of the virtual object OBJ moving are output from the information processing apparatus 3, and simultaneously, the vibrations of the virtual object OBJ moving are imparted to the information processing apparatus 3. Specifically, in the second exemplary game, sounds indicating that the virtual object OBJ is moving within the display screen are output from the stereo loudspeakers (the left sound output section 36L and the right sound output section 36R) such that the display position of the virtual object OBJ is the sound source localization position. Further, in the second exemplary game, vibrations indicating that the virtual object OBJ is moving within the display screen are imparted by the left actuator 373L and the right actuator 373R such that the display position of the virtual object OBJ is the position to be perceived as the vibration source in a pseudo manner. Then, if the virtual object OBJ moves from the virtual world displayed within the display screen of the display section 35 to the virtual world outside the display screen, also the sound source localization position and the position to be perceived as the vibration source move to outside the display screen of the display section 35 in accordance with the movement of the virtual object OBJ (see (B) of FIG. 8).

Then, as shown in (C) of FIG. 8, if the virtual object OBJ moves in the virtual world that is not displayed on the display screen of the display section 35, a position (the position of the virtual object OBJ indicated by a dashed line in (C) of FIG. 8) at which the virtual object OBJ is assumed to move on the basis of a position in the virtual world displayed on the display screen is set as the sound source localization position and the position to be perceived as the vibration source. For example, 3D audio effects are generated using surround technology, binaurally recorded sounds, and the like, thereby outputting, from the stereo loudspeakers, sounds indicating that the virtual object OBJ is moving outside the display screen such that the position of the virtual object OBJ set outside the stereo loudspeakers of the information processing apparatus 3 is the sound source localization position. Further, the vibrations to be imparted by the left actuator 373L and the right actuator 373R are adjusted so that the left and right vibration intensities have a predetermined balance, and the user is caused to perceive as the vibration source the position of the virtual object OBJ set outside the left actuator 373L and the right actuator 373R, by visual sensation for indicating to the user that the virtual object OBJ has moved to outside the display screen and auditory sense for indicating the sound source localization position of the above 3D audio effects to the user.

A description is given of the vibrations when, for example, after the virtual object OBJ has moved from the virtual world outside the display screen of the display section 35 to the virtual world displayed within the display screen, the virtual object OBJ passes through the virtual world within the display screen and moves to the virtual world outside the display screen. To make the description specific, as shown in FIG. 9, a case is assumed where the virtual object OBJ moves from the virtual world formed outside the display screen on the left side, passes through the virtual world displayed on the display screen, and moves to the virtual world formed outside the display screen on the right side (the virtual object OBJ moves along a path in the order of OBJ1, OBJ2, OBJ3, OBJ4, OBJ5, and OBJ6 shown in FIG. 9). It should be noted that the following description is given on the assumption that the distance between the left actuator 373L and the right actuator 373R is X (if the distance is almost the same as the width of the display screen of the display section 35 in the left-right direction, the width is also X).

If the virtual object OBJ moves along the above movement path, the intensity of the vibration imparted by the left actuator 373L is strongest at the time when the virtual object OBJ passes through the position where the left actuator 373L is provided (i.e., the position where the user holds the main body of the information processing apparatus 3 with the left hand, and a position near the left end of the display screen of the display section 35) (at the time when the virtual object OBJ passes through the position indicated by the virtual object OBJ3) (the peak of the intensity of the vibration is defined as a vibration intensity P). Then, when the virtual object OBJ passes through the position where the right actuator 373R is provided (i.e., the position where the user holds the main body of the information processing apparatus 3 with the right hand; a position near the right end of the display screen of the display section 35; a position to the right, at the distance X, of the position where the intensity of the vibration is at the peak; and the position indicated by the virtual object OBJ4), the intensity of the vibration imparted by the left actuator 373L is ¼ of the vibration intensity P at the peak. Then, if the virtual object OBJ moves to the virtual world formed outside the display screen on the right side and when the virtual object OBJ passes through a position (the position indicated by the virtual object OBJ5) outside the display screen further to the right, at the distance X, of the position indicated by the virtual object OBJ4, the intensity of the vibration imparted by the left actuator 373L is ⅟16 of the vibration intensity P at the peak. Further, when the virtual object OBJ passes through a position (the position indicated by the virtual object OBJ6) outside the display screen to the right, at a distance 2X, of the position indicated by the virtual object OBJ4, the intensity of the vibration imparted by the left actuator 373L is ⅟64 of the vibration intensity P at the peak.

If the virtual object OBJ moves in the virtual world formed outside the display screen on the left side and when the virtual object OBJ passes through a position (the position indicated by the virtual object OBJ2) outside the display screen to the left, at the distance X, of the position where the intensity of the vibration is at the peak (the position indicated by the virtual object OBJ3), the intensity of the vibration imparted by the left actuator 373L is ¼ of the vibration intensity P at the peak. Further, when the virtual object OBJ passes through a position (the position indicated by the virtual object OBJ1) outside the display screen to the left, at the distance 2X, of the position where the intensity of the vibration is at the peak, the intensity of the vibration imparted by the left actuator 373L is 1/16 of the vibration intensity P at the peak. If the virtual object OBJ moves along the above movement path, the intensity of the vibration imparted by the left actuator 373L is changed based on a function connecting these points (a function defining a curve shown in FIG. 9). As is clear from FIG. 9, the intensity of the vibration imparted by the left actuator 373L is changed based on a function of attenuating the intensity of the vibration symmetrically to the left and right of the position where the intensity of the vibration is at the peak.

If, on the other hand, the virtual object OBJ moves along the above movement path, the intensity of the vibration imparted by the right actuator 373R is strongest at the time when the virtual object OBJ passes through the position where the right actuator 373R is provided (i.e., the position where the user holds the main body of the information processing apparatus 3 with the right hand, and a position near the right end of the display screen of the display section 35) (at the time when the virtual object OBJ passes through the position indicated by the virtual object OBJ4) (the peak of the intensity of the vibration is defined as a vibration intensity P). Then, when the virtual object OBJ passes through the position where the left actuator 373L is provided (a position to the left, at a distance X, of the position where the intensity of the vibration is at the peak; a position near the left end of the display screen of the display section 35; and the position indicated by the virtual object OBJ3), the intensity of the vibration imparted by the right actuator 373R is 1/4 of the vibration intensity P at the peak. Then, if the virtual object OBJ moves in the virtual world formed outside the display screen on the left side and when the virtual object OBJ passes through a position (the position indicated by the virtual object OBJ2) outside the display screen further to the left, at the distance X, of the position indicated by the virtual object OBJ3, the intensity of the vibration imparted by the right actuator 373R is 1/16 of the vibration intensity P at the peak. Further, when the virtual object OBJ passes through a position (the position indicated by the virtual object OBJ1) outside the display screen to the left, at a distance 2X, of the position indicated by the virtual object OBJ3, the intensity of the vibration imparted by the right actuator 373R is 1/64 of the vibration intensity P at the peak.

If the virtual object OBJ moves in the virtual world formed outside the display screen on the right side and when the virtual object OBJ passes through a position (the position indicated by the virtual object OBJ5) outside the display screen to the right, at the distance X, of the position where the intensity of the vibration is at the peak (the position indicated by the virtual object OBJ4), the intensity of the vibration imparted by the right actuator 373R is 1/4 of the vibration intensity P at the peak. Further, when the virtual object OBJ passes through a position (the position indicated by the virtual object OBJ6) outside the display screen to the right, at the distance 2X, of the position where the intensity of the vibration is at the peak, the intensity of the vibration imparted by the right actuator 373R is 1/16 of the vibration intensity P at the peak. If the virtual object OBJ moves along the above movement path, also the intensity of the vibration imparted by the right actuator 373R is changed based on a function connecting these points (a function defining a curve shown in FIG. 9). Further, as is clear from FIG. 9, also the intensity of the vibration imparted by the right actuator 373R is changed based on a function of attenuating the intensity of the vibration symmetrically to the left and right of the position where the intensity of the vibration is at the peak.

As described above, if the virtual object OBJ moves in the virtual world formed outside the display screen, the intensities of the vibrations imparted by the left actuator 373L and the right actuator 373R are adjusted to have a predetermined balance, thereby causing the user to perceive a position outside the display screen as the vibration source. In the example shown in FIG. 9, if the virtual object OBJ moves in the virtual world formed outside the display screen on the right side, each of the intensity of the vibration imparted by the left actuator 373L and the intensity of the vibration imparted by the right actuator 373R is controlled by an attenuation function for obtaining a ratio of these vibration intensities of 1:4. If, on the other hand, the virtual object OBJ moves in the virtual world formed outside the display screen on the left side, each of the intensity of the vibration imparted by the left actuator 373L and the intensity of the vibration imparted by the right actuator 373R is controlled by an attenuation function for obtaining a ratio of these vibration intensities of 4:1.

It should be noted that the balance between the intensities of the vibrations imparted by the left actuator 373L and the right actuator 373R when the user is caused to perceive a position outside the display screen as the vibration source does not need to be the above ratio. Alternatively, the above ratio may be appropriately set in accordance with the absolute values of the intensities of the vibrations to be imparted, the structure of the main body of the information processing apparatus 3, the absolute value of the distance X, the distance between the display screen and the position to be perceived as the vibration source, and the like. Yet alternatively, the balance may be controlled so that one of the intensities of the vibrations imparted by the left actuator 373L and the right actuator 373R is 0.

Further, in FIG. 9, an example has been used where the intensities of the vibrations imparted by the left actuator 373L and the right actuator 373R are changed based on a function connecting the above points (an attenuation function defining a curve shown in FIG. 9). Alternatively, each of the intensities of the vibrations may be changed based on another attenuation function. For example, each of the intensities of the vibrations imparted by the left actuator 373L and the right actuator 373R may be a linear function or a quadratic function of attenuating the intensity of the vibration symmetrically to the left and right of the position where the intensity of the vibration is at the peak, and may be changed based on a high-dimensional function of three or more dimensions or another attenuation function. Further, control may be performed so that the vibration intensity P at the peak of the vibration imparted by each of the left actuator 373L and the right actuator 373R is generated not only at the above peak position but also when the virtual object OBJ is moving within a certain range from the peak position. In this case, the range where a vibration having the vibration intensity P at the peak is imparted is set to a certain range. Further, a function of attenuating each of the intensities of the vibrations imparted by the left actuator 373L and the right actuator 373R from the peak position may not be a function of attenuating the intensity of the vibration symmetrically to the left and right of the peak position.

Further, an example has been described above where the intensities of the vibrations imparted by the left actuator 373L and the right actuator 373R are attenuated. Alternatively, the sounds to be output from the left and right loudspeakers (e.g., the sound volumes) may be controlled using a similar attenuation function.

Further, in the first exemplary game and the second exemplary game described above, the position to be perceived as the vibration source is set in accordance with the position of each of the player character PC and the virtual object OBJ moving in the virtual world. Alternatively, the position to be perceived as the vibration source in the exemplary embodiment does not need to be the position of an image of which the movement is displayed. For example, the vibrations to be imparted by the left actuator 373L and the right actuator 373R may be controlled so that a virtual object fixedly displayed on the display screen of the display section 35 is the vibration source. Further, if an image obtained by capturing the real world is displayed on the display screen of the display section 35, the vibrations to be imparted by the left actuator 373L and the right actuator 373R may be controlled so that the position of a captured object in the real world that appears in the image is the vibration source.

Figure 10:
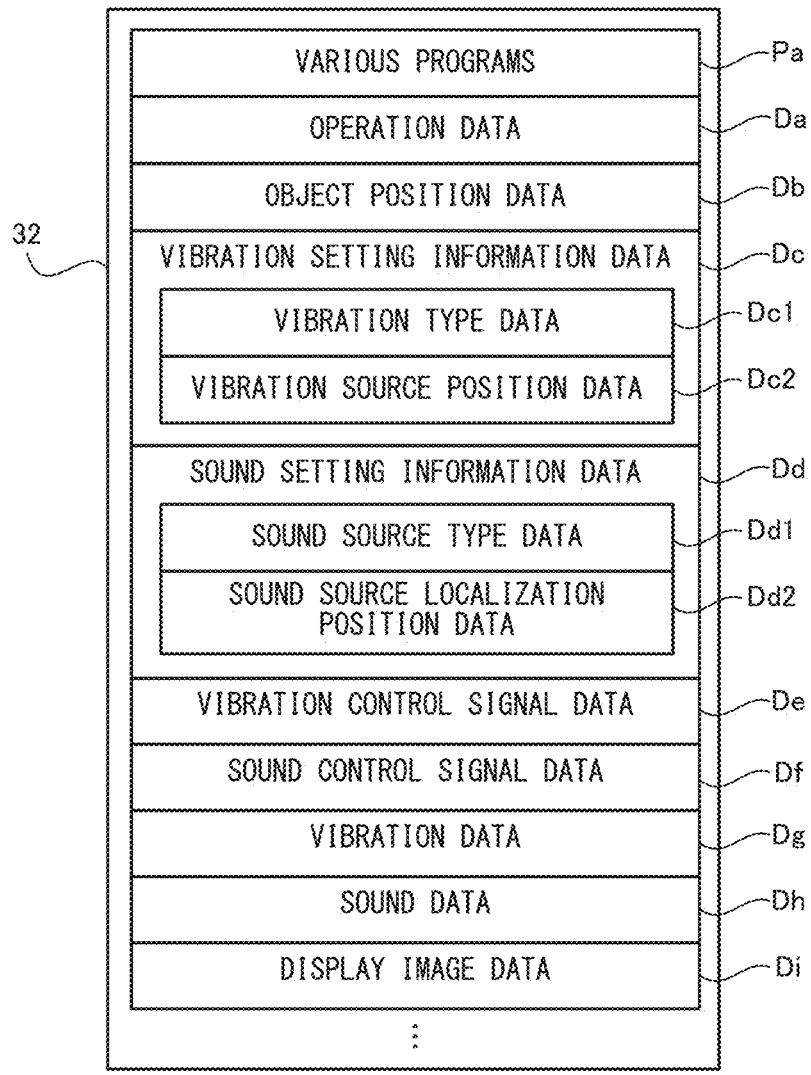
FIG. 10 is a diagram showing non-limiting examples of main data and programs stored in a storage section 32 of the information processing apparatus 3.

Next, a detailed description is given of the processing performed by the information processing apparatus 3. First, with reference to FIG. 10, main data used in the processing is described. FIG. 10 is a diagram showing examples of main data and programs stored in the storage section 32 of the information processing apparatus 3. It should be noted that in the following exemplary processing, a description is given using the information processing when the game processing of the above second exemplary game is performed.

As shown in FIG. 10, the following are stored in the data storage area of the storage section 32: operation data Da; object position data Db; vibration setting information data Dc; sound setting information data Dd; vibration control signal data De; sound control signal data Df; vibration data Dg; sound data Dh; display image data Di; and the like. It should be noted that the storage section 32 may store, as well as the data shown in FIG. 10, data and the like necessary for the processing, such as data used in an application to be executed. Further, in the program storage area of the storage section 32, various programs Pa included in the information processing program are stored. For example, the various programs Pa include a vibration generation program for generating vibration control signals to impart vibrations to the information processing apparatus 3, a sound generation program for generating sound control signals to output sounds from the information processing apparatus 3, an image display program for displaying an image on the display section 35, and the like.

The operation data Da is data representing the content of the operation performed on the input section 34 and includes, for example, data representing the touch position of a touch operation on the touch panel 341. It should be noted that if the input section 34 includes a sensor for detecting the orientation and the motion of the main body of the information processing apparatus 3, the operation data Da may include data for calculating the orientation and the motion of the main body of the information processing apparatus 3 (e.g., data representing the acceleration generated in the main body of the information processing apparatus 3 and data representing the angular velocity of the main body of the information processing apparatus 3).

The object position data Db is data representing the position of a virtual object OBJ moving in a virtual world (see FIGS. 4 and 8).

The vibration setting information data Dc includes vibration type data Dc1, vibration source position data Dc2, and the like. The vibration type data Dc1 is data representing the type of vibrations to be imparted to the information processing apparatus 3. The vibration source position data Dc2 is data representing the position to be perceived as the vibration source by the user of the information processing apparatus 3.

The sound setting information data Dd includes sound source type data Dd1, sound source localization position data Dd2, and the like. The sound source type data Dd1 is data representing the type of sounds to be output from the information processing apparatus 3. The sound source localization position data Dd2 is data representing the sound source localization position of sounds to be output from the information processing apparatus 3.

The vibration control signal data De is data representing vibration control signals to be output from the control section 31 to the vibration generation section 37 (the left vibration control signal CSL and the right vibration control signal CSR; see FIG. 3). The sound control signal data Df is data representing sound control signals to be output from the control section 31 to the sound output section 36 (the left sound control signal and the right sound control signal).

The vibration data Dg is data prepared in advance for generating vibration control signals and is stored for each type of vibration to be imparted to the main body of the information processing apparatus 3 (e.g., for each virtual object for which vibrations are generated). The sound data Dh is data prepared in advance for generating sound control signals and is stored for each type of sound to be output from the information processing apparatus 3 (e.g., for each virtual object for which sounds are produced or each type of BGM).

The display image data Di is data for generating an image of each virtual object such as the virtual object OBJ, a background image, and the like and displaying the generated images on the display section 35.

Figure 11:
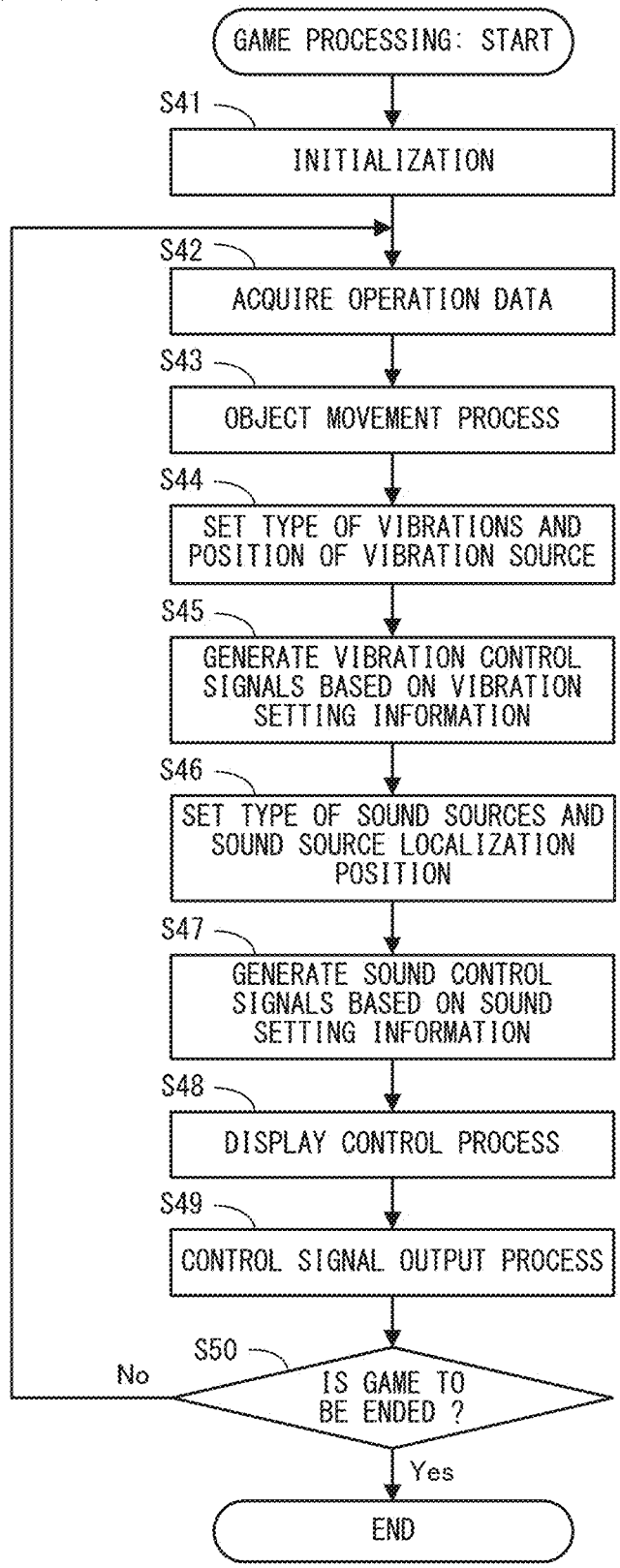
FIG. 11 is a flow chart showing a non-limiting example of game processing performed by the information processing apparatus 3.

Next, with reference to FIG. 11, a detailed description is given of the game processing, which is an example of the information processing performed by the information processing apparatus 3. It should be noted that FIG. 11 is a flow chart showing an example of the game processing performed by the information processing apparatus 3. Here, in the flow chart shown in FIG. 11, a description is given mainly of, in the processing performed by the information processing apparatus 3, the process of outputting vibrations and sounds corresponding to the movement of the virtual object OBJ in the virtual world in the second exemplary game. The detailed descriptions of other processes not directly related to these processes are omitted. Further, in FIG. 11, all of the steps performed by the control section 31 are abbreviated as "S".

The CPU of the control section 31 initializes a memory and the like of the storage section 32 and loads the information processing program from the program storage section 33 into the memory. Then, the CPU starts the execution of the information processing program. The flow chart shown in FIG. 11 is a flow chart showing the processing performed after the above processes are completed.

It should be noted that the processes of all of the steps in the flow chart shown in FIG. 11 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section 31 (the CPU) performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 11, the control section 31 performs initialization (step 41), and proceeds to the subsequent step. For example, the control section 31 constructs a virtual world to be displayed on the display section 35 and initializes parameters. As an example, the control section 31 places the virtual object OBJ at an initial position in the virtual world and sets the object position data Db. Further, the control section 31 sets the display range to be displayed on the display screen of the display section 35 for the virtual world.

Next, the control section 31 acquires operation data from the input section 34 and updates the operation data Da (step 42), and the processing proceeds to the next step.

Next, the control section 31 performs the process of causing the virtual object OBJ to move in the virtual world (step 43), and the processing proceeds to the next step. For example, the control section 31 causes the virtual object OBJ to move at a moving speed determined in advance along a movement path determined in advance in the virtual world and updates the object position data Db using the position of the virtual object OBJ after the movement. As another example, if the control section 31 causes the virtual object OBJ to move in accordance with an operation on the input section 34 (including the operation of moving or tilting the main body of the information processing apparatus 3), the control section 31 causes the virtual object OBJ to move in the virtual world in accordance with the operation data acquired in the above step 42 and updates the object position data Db using the position of the virtual object OBJ after the movement.

Next, the control section 31 sets the type of vibrations and the position of the vibration source (step 44), and the processing proceeds to the next step. For example, based on the vibration generation program and the type of the virtual object OBJ placed in the virtual world, the control section 31 sets the type of vibrations when the virtual object OBJ moves. Then, the control section 31 updates the vibration type data Dc1 using data representing the type of vibrations. Further, based on the vibration generation program, the control section 31 sets the position of the vibration source such that the position of the virtual object OBJ indicated by the object position data Db is perceived as the vibration source by the user. Then, the control section 31 updates the vibration source position data Dc2 using data representing the set position.

Next, based on vibration setting information, the control section 31 sets vibration control signals (step 45), and the processing proceeds to the next step. For example, based on the vibration generation program and the vibration setting information data Dc (the vibration type data Dc1 and the vibration source position data Dc2), the control section 31 generates vibration control signals (the left vibration control signal CSL and the right vibration control signal CSR to be output to the vibration generation section 37; see FIG. 3) using vibration data read from the vibration data Dg and stores the vibration control signals in the vibration control signal data De. Specifically, the control section 31 reads data from the vibration data Dg and generates the left vibration control signal CSL and the right vibration control signal CSR corresponding to the vibrations of the type indicated by the vibration type data Dc1, so that the vibrations of the type indicated by the vibration type data Dc1 are imparted to the main body of the information processing apparatus 3, and the position indicated by the vibration source position data Dc2 is perceived as the vibration source of the vibrations.

Next, the control section 31 sets the type of sound sources and the position where the sound sources are localized (step 46), and the processing proceeds to the next step. For example, based on the sound generation program and the type of the virtual object OBJ placed in the virtual world, the control section 31 sets the type of sounds when the virtual object OBJ moves. Then, the control section 31 updates the sound source type data Dd1 using data representing the type of sounds. Further, based on the sound generation program, the control section 31 sets the sound source localization position such that the position of the virtual object OBJ indicated by the object position data Db is the sound source localization position of the sounds. Then, the control section 31 updates the sound source localization position data Dd2 using data representing the sound source localization position.

Next, based on sound setting information, the control section 31 sets sound control signals (step 47), and the processing proceeds to the next step. For example, based on the sound generation program and the sound setting information data Dd (the sound source type data Dd1 and the sound source localization position data Dd2), the control section 31 generates sound control signals (the left sound control signal and the right sound control signal to be output to the sound output section 36) and stores the sound control signals in the sound control signal data Df. Specifically, the control section 31 reads data from the sound data Dh and generates the left sound control signal and the right sound control signal, so that the sounds of the type indicated by the sound source type data Dd1 are output from the stereo loudspeakers of the information processing apparatus 3, and the position indicated by the sound source localization position data Dd2 is the sound localization position.

Next, the control section 31 performs a display control process (step 48), and the processing proceeds to the next step. For example, based on an image generation program and the object position data Db, the control section 31 performs the process of generating an image of the virtual world in which the virtual object OBJ is placed, and displaying on the display section 35 the image of the virtual world in the set display range.

Next, the control section 31 performs a control signal output process (step 49), and the processing proceeds to the next step. For example, the control section 31 outputs to the vibration generation section 37 the left vibration control signal CSL and the right vibration control signal CSR indicated by the vibration control signal data De. Consequently, the vibration generation section 37 generates a vibration corresponding to the left vibration control signal CSL from the left actuator 373L and generates a vibration corresponding to the right vibration control signal CSR from the right actuator 373R. Further, the control section 31 outputs to the sound output section 36 the left sound control signal and the right sound control signal indicated by the sound control signal data Df. Consequently, the sound output section 36 outputs a sound corresponding to the left sound control signal from the left loudspeaker and outputs a sound corresponding to the right sound control signal from the right loudspeaker.

Next, the control section 31 determines whether or not the game processing is to be ended (step 50). Examples of conditions for ending the game processing include: the satisfaction of the condition under which the game processing is ended; and the fact that the user has performed the operation of ending the game processing. If the game processing is not to be ended, the control section 31 returns to the above step 42 and repeats the process thereof. If the game processing is to be ended, the control section 31 ends the processing indicated by the flow chart.

As described above, in the game processing according to the above exemplary embodiment, if the virtual object OBJ moves in the virtual world, vibrations in a wide band imparted by the left actuator 373L and the right actuator 373R are imparted to the information processing apparatus 3, whereby it is possible to impart vibrations rich in variety to the user of the apparatus. Further, in the game processing according to the above exemplary embodiment, it is possible to cause the user to perceive as the vibration source the position where the virtual object OBJ is placed in the virtual world. Here, in the game processing according to the above exemplary embodiment, sounds in a wide band when the virtual object OBJ moves are output such that the position where the virtual object OBJ is placed in the virtual world is the sound source localization position of the sounds output from the information processing apparatus 3. Further, if the virtual object OBJ is placed in the virtual world displayed on the display screen of the display section 35, the position where the virtual object OBJ is placed is displayed on the display screen of the display section 35. As described above, the position of the virtual object OBJ is presented using tactile sensation based on vibrations in a wide band, auditory sense based on sounds in a wide band, and visual sensation based on the display of a moving object on the display screen, whereby it is possible to impart unconventional bodily sensation rich in reality to the user.

Further, even if the virtual object OBJ is moving in the virtual world set outside the display screen, vibrations to be imparted by the left actuator 373L and the right actuator 373R are adjusted to have a predetermined balance, and the sound source localization position is set to the position of the virtual object OBJ outside the display screen while indicating to the user that the virtual object OBJ has moved to outside the display screen. Thus, it is also possible to cause the user to perceive as the vibration source even the position of the virtual object OBJ set outside the left actuator 373L and the right actuator 373R.

It should be noted that the above descriptions are given using the example where the information processing apparatus 3 performs information processing (game processing). Alternatively, another apparatus may perform at least some of the processing steps in the information processing. For example, if the information processing apparatus 3 is further configured to communicate with another apparatus (e.g., another server, another game apparatus, or another mobile terminal), the other apparatus may cooperate to perform the processing steps of the information processing. As an example, another apparatus may perform at least one of the virtual world image generation process, the vibration control signal generation process, and the sound control signal generation process, and the information processing apparatus 3 may acquire image data and control signals indicating the result of the process. Another apparatus may thus perform at least some of the processing steps in the information processing, thereby enabling processing similar to the above information processing. Further, the above information processing can be performed by a processor or the cooperation of a plurality of processors, the processor or the plurality of processors included in an information processing system including at least one information processing apparatus. Further, in the above exemplary embodiment, the processing indicated in the above flow chart is performed by the control section 31 of the information processing apparatus 3 executing a predetermined game program. Alternatively, a part or all of the information processing indicated in the flow chart may be performed by a dedicated circuit included in the information processing apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the information processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the above information processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. As an example, three or more actuators may impart vibrations to the information processing apparatus, or three or more loudspeakers may output sounds from the information processing apparatus. Alternatively, the information processing apparatus may include a plurality of display sections. Further, in the above description, a handheld apparatus (e.g., a tablet terminal) has been used an example of the information processing apparatus 3. Alternatively, the information processing apparatus 3 may be a portable apparatus larger than a handheld apparatus. Here, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above handheld apparatus.

In addition, the information processing program may be supplied to the information processing apparatus 3 not only through an external storage medium such as the external memory 45, but also through a wired or wireless communication link. Further, the information processing program may be stored in advance in a non-volatile storage device included in the information processing apparatus 3. It should be noted that examples of an information storage medium having stored therein the information processing program may include CD-ROMs, DVDs, optical disk storage media similar to these, flexible disks, hard disks, magneto-optical disks, and magnetic tapes, as well as non-volatile memories. Alternatively, an information storage medium having stored therein the information processing program may be a volatile memory for storing the information processing program. It can be said that such a storage medium is a storage medium readable by a computer or the like. For example, it is possible to provide the above various functions by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing apparatus, an information processing program, an information processing system, an information processing method, and the like in order, for example, to impart vibrations rich in variety to a user.

What is claimed is:

1. A system comprising:
   a display having a display area;
   a pair of vibrators; and
   one or more processors operatively coupled to the display and the pair of vibrators, the one or more processors configured to:
      generate stereo sound signals;
      generate vibration signals for controlling the pair of vibrators to vibrate, each vibration signal having a plurality of frequency components, the vibration signals determining a position to perceive a vibration source; and
      generate image signals to control an image to be displayed on the display,
   wherein:
   in controlling the image, the one or more processors control display on the display of at least one object moving from a corresponding position in a virtual world displayed on the display to a corresponding position in the virtual world outside the display area and/or moving from the corresponding position in the virtual world outside the display area to the corresponding position in the virtual world displayed on the display, and
   in generating the vibration signals, even if the object is placed at the corresponding position in the virtual world outside the display area, the one or more processors control a position of a vibration source to be perceived based on the vibrations of the vibrators in accordance with placement position of the object.

2. The system of claim 1 wherein the one or more processors generate vibration signals to maximize vibration amplitude at the instant when the object moves from the display area to outside the display area.

3. The system of claim 1 wherein the one or more processors generate vibration signals to maximize vibration amplitude at the instant when the object moves from outside the display area to within the display area.

4. The system of claim 1 wherein the one or more processors generate vibration signals that are configured to indicate a perceived phantom single position when one of the plural vibrators is held by a first hand of a user and another of the plural vibrators is held by a second hand of the user.

5. The system of claim 1 wherein the one or more processors generate vibration signals that have a predetermined balance when the object is displayed outside of the display area, thereby providing a simulated vibration source position outside the display area.

6. The system of claim 1 wherein the one or more processors are configured to control the ratio of one of the vibration signals relative to another of the vibration signals.

7. The system of claim 1 wherein the one or more processors are configured to control the relative amplitudes of the vibration signals as a linear function.

8. The system of claim 1 wherein the one or more processors are configured to control the relative amplitudes of the vibration signals as a quadratic function.

9. The system of claim 1 wherein the one or more processors are configured to control the relative amplitudes of the vibration signals to simulate a vibration source that is outside of the display area.

10. A system comprising:
    a display having a display area;
    a first handheld vibrator;
    a second handheld vibrator; and
    one or more processors operatively coupled to the display and the first and second vibrators, the one or more processors configured to:
       generate image signals to control an image to be displayed on the display, wherein in controlling the image, the one or more processors control display on the display of at least one object moving from a corresponding position in a virtual world displayed on the display to a corresponding position in the virtual world outside the display area and/or moving from the corresponding position in the virtual world outside the display area to the corresponding position in the virtual world displayed on the display, and
       generate a first vibration signal for controlling the first vibrator and a second vibration control signal for controlling the second vibrator, each vibration signal having a plurality of frequency components, the first and second vibration signals being configured to control the first and second vibrators to generate vibration that is perceived as originating from a single vibration source outside the display area.

11. The system of claim 10 wherein the one or more processors generate vibration signals to maximize vibration amplitude at the instant when the object moves from the display area to outside the display area.

12. The system of claim 10 wherein the one or more processors generate vibration signals to maximize vibration amplitude at the instant when the object moves from outside the display area to within the display area.

13. The system of claim 10 wherein the one or more processors generate vibration signals that are configured to indicate a perceived phantom single position when one of the plural vibrators is held by a first hand of a user and another of the plural vibrators is held by a second hand of the user.

14. The system of claim 10 wherein the one or more processors generate vibration signals that have a predetermined balance when the object is displayed outside of the display area, thereby providing a simulated vibration source position outside the display area.

15. The system of claim 10 wherein the one or more processors are configured to control the ratio of one of the vibration signals relative to another of the vibration signals.

16. The system of claim 10 wherein the one or more processors are configured to control the relative amplitudes of the vibration signals as a linear function.

17. The system of claim 10 wherein the one or more processors are configured to control the relative amplitudes of the vibration signals as a quadratic function.

18. The system of claim 10 wherein the one or more processors are configured to control the relative amplitudes of the vibration signals to simulate a vibration source that is outside of the display area.

19. A system comprising:
a display having a display area;
a first vibrator for applying vibrations to a first hand;
a second vibrator for applying vibrations to a second hand; and
a processor operatively coupled to the display and the first and second vibrators, the processor configured to generate a first vibration signal for controlling the first vibrator and a second vibration control signal for controlling the second vibrator, each vibration signal having a plurality of frequency components, the first and second vibration signals being configured to together control the first and second vibrators to generate vibration that is perceived through the first and second hands as originating from a vibration source outside the display area.

20. The system of claim 19 wherein the one or more processors generate vibration signals that are configured to indicate a perceived phantom single position when one of the plural vibrators is held by the first hand of a user and another of the plural vibrators is held by the second hand of the user.

* * * * *